United States Patent [19]

Schlensker

[11] Patent Number: 4,851,112
[45] Date of Patent: Jul. 25, 1989

[54] FISH TANK FILTER

[76] Inventor: Greg A. Schlensker, R.R. #4, Box 165, Anderson, Ind. 46011

[21] Appl. No.: 868,859

[22] Filed: May 30, 1986

[51] Int. Cl.⁴ .................... B01D 23/16; B01D 35/30
[52] U.S. Cl. .................. 210/123; 210/169; 210/258; 210/261; 210/264; 210/291; 210/416.2; 119/5
[58] Field of Search .............. 210/169, 194, 195.1, 210/258, 261, 264, 285, 291, 416.2, 123; 119/3, 5

[56] References Cited

U.S. PATENT DOCUMENTS

| | | | |
|---|---|---|---|
| 2,729,337 | 1/1956 | Alferman | 210/150 |
| 3,351,328 | 11/1967 | Vetterli | 119/5 |
| 3,848,567 | 11/1974 | Garber, Jr. | 119/5 |
| 3,892,663 | 7/1975 | Wiedenmann | 210/169 |
| 3,957,634 | 5/1976 | Orensten et al. | 210/169 |
| 4,220,530 | 9/1980 | Gabriele | 210/86 |
| 4,312,752 | 1/1982 | Malik | 210/169 |
| 4,552,657 | 11/1985 | Ogawa | 210/169 |

FOREIGN PATENT DOCUMENTS

| | | | |
|---|---|---|---|
| 200472 | 9/1905 | Fed. Rep. of Germany | 119/5 |
| 200170 | 9/1920 | Fed. Rep. of Germany | 119/5 |
| 190305 | 12/1920 | Fed. Rep. of Germany | 119/5 |
| 539208 | 12/1929 | Fed. Rep. of Germany | 119/5 |
| 2913170 | 10/1980 | Fed. Rep. of Germany | 119/5 |
| 793535 | 1/1981 | U.S.S.R. | 119/5 |

Primary Examiner—Richard V. Fisher
Assistant Examiner—Wanda L. Millard
Attorney, Agent, or Firm—John H. Calhoun, Jr.

[57] ABSTRACT

A fish tank filter comprising an overflow tank for collecting surface waters from a fish tank, means for conveying the waters to a dry filter, a dry filter comprising a plurality of vertically stacked filter pans each having a filter material therein, a means for collecting the effluent from the dry filter and conveying it to a wet filter, a wet filter comprising a plurality of serially arranged filter material-containing filter compartments in a tank, and means for returning purified water to the fish tank.

4 Claims, 1 Drawing Sheet

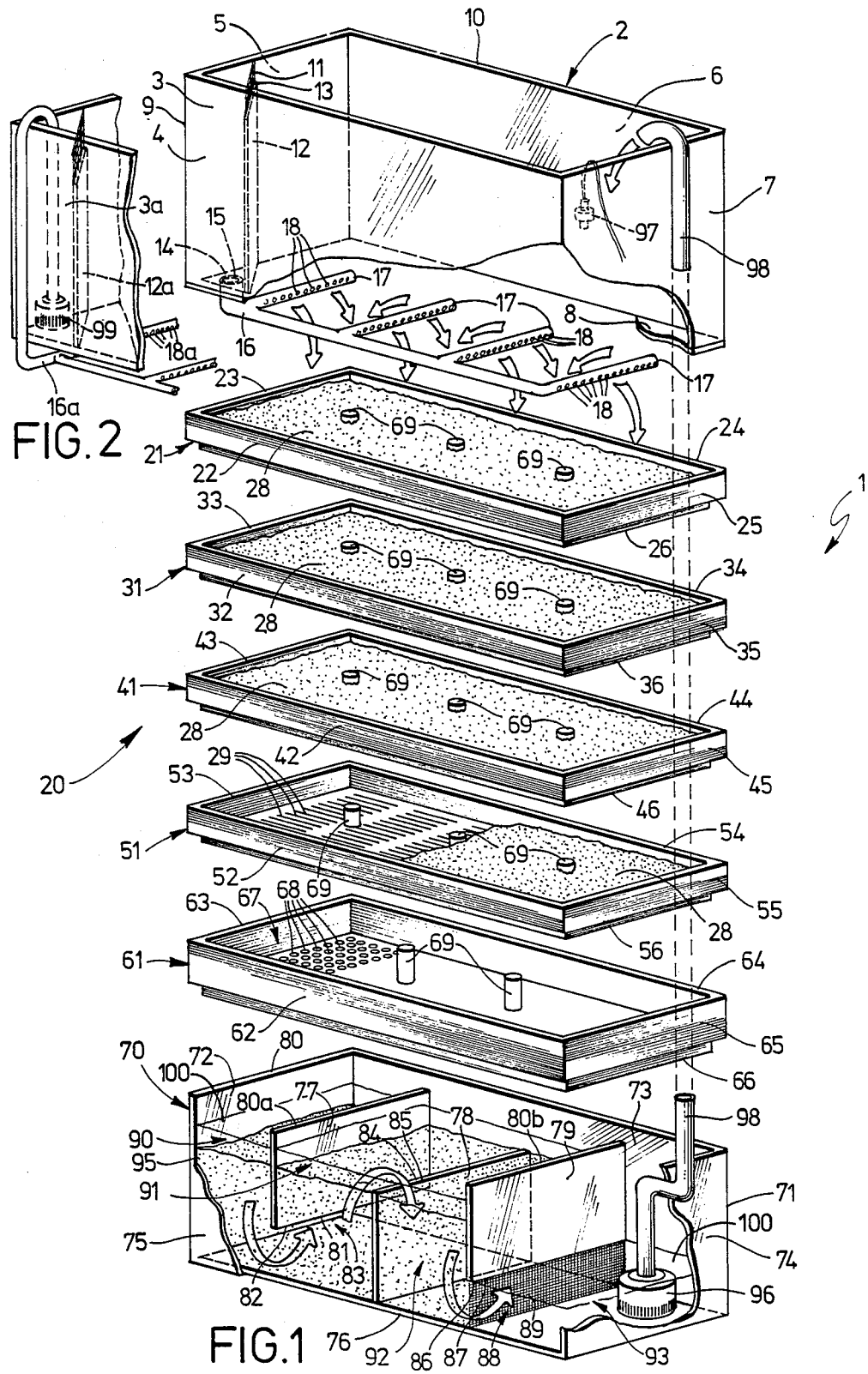

FISH TANK FILTER

BACKGROUND OF THE INVENTION

The present invention relates to an improved fish tank filter, that is a device that is used for filtering, purifying and aerating water in a fish tank.

Fish tank filters are known in the prior art as illustrated by U.S. Pat. No. 3,892,663 issued to Walter Wiedenmann on July 1, 1975 which shows a home finish-tank filter construction; and U.S. Pat. No. 4,220,530 issued to Raymond S. Garbiele on Sept. 2, 1980 for a fish tank filter; and U.S. Pat. No. 2,729,337 issued to A. G. Alferman on Jan. 3, 1956 for a fish aquarium and filter apparatus; and U.S. Pat. No. 4,312,752 issued to Richard J. Malik on Jan. 26, 1982 for an aquarium filter apparatus; and U.S. Pat. No. 4,552,657 issued to Yonekichi Ogawa on Nov. 12, 1985 for a filter; and U.S. Pat. No. 3,957,634 issued to Henry E. Orensten, et al. on May 18, 1976 for a filtration means and method.

The present invention provides a novel and useful fish tank filter that is adapted for filtering water in which salt water fish reside and which is adapted to aerate the water, remove scum from the top of the water, and biologically remove products of fish metabolism from the water, which water is then returned to the tank.

SUMMARY OF THE INVENTION

The fish tank filter of the present invention has all the advantages of fish tank filters known in the prior art, and in addition it provides several distinct and important advantages not found in previously known filters.

One objective of the present invention is to provide a fish tank filter that filters surface waters from a fish tank, since certain life threatening contaminates tend to collect on the surface.

Another object of the present invention is to provide a fish tank filter that provides both mechanical and biological filtration of contaminates from surfaces waters of fish tanks.

Another object of the present invention is to provide a fish tank filter that is simple in construction, inexpensive, strong and durable and well adapted for its intended uses.

Other objects and advantages of the present invention will become apparent from a consideration of the following detailed description taken in connection with the accompanying drawings wherein a preferred embodiment of the invention is shown.

It should be understood that the invention is not limited to the details disclosed, but includes all such variations and modifications as fall within the spirit of the invention and the scope of the appended claims.

The objectives of the present invention are accomplished by providing a fish tank filter comprising an overflow tank that is adapted to receive an overflow of surface waters from a fish tank; a means for conveying the surface waters from the overflow tank to the top of a vertically stacked, multi-stage dry filter; a vertically stacked, multi-stage dry filter that mechanically removes solid contaminates from the waters; a wet filter that biologically removes chemical contaminates from the waters; and a means for returning the purified water to the fish tank.

In the illustrated embodiment the overflow tank is formed by placing inside a fish tank a partition that is slightly shorter than the depth of the water in the tank and that divides the tank into two parts. Extending above the partition is a non-metallic mesh screen that serves as a trap or filter to prevent dead fish and other large debris from entering into the overflow tank. A gravity drain is provided in the bottom of the overflow tank and a drain pipe having perforations in its distal end conveys the water from the drain to the top of a dry filter. The dry filter comprises a plurality of filter pans, having perforated bottoms, that are stacked vertically in spaced apart relationships relative to each other and that each contain a quantity of filter material such, for example, as crushed coral gravel. Water drips out of the perforations at the distal end of the drain pipe and onto the filter material in the top filter pan. The water then passes through the filter material in the top filter pan and drips through the perforations in the bottom of the first filter pan and onto the filter material in the second filter pan. The process is repeated for several pans, the illustrated embodiment showing four such pans.

The effluent from the bottom most filter pan is collected in a collector pan that is placed below the stack of filter pans and above an end compartment of a compartmented wet filter. The collector pan is provided with perforations in a portion of its bottom. The effluent drips through the perforations in the bottom of the collector pan into the end compartment of the wet filter.

The wet filter comprises a plurality of serially arranged compartments in a tank, and in the illustrated embodiment four such compartments are shown. The compartments are formed by vertical partitions extending across the width of the tank, and the partitions are selected so that water will flow from the first compartment under the first partition and into the second compartment, thence from the second compartment over the second partition and into the third compartment, thence from the third compartment under the third partition and into the fourth compartment from which it is pumped back into the fish tank. A quantity of filter material is placed in the bottom of the first three compartments, and water is kept in the tank at all times. Waters dripping into the wet filter from the dry filter percolate through the filter material in the first compartment and under the first partition and into the second compartment. Waters entering the second compartment percolate upward through the filter material in the second compartment and overflow into the third compartment. Waters overflowing into the third compartment percolate through the filter material in the bottom of the third compartment and under the third partition into the fourth compartment. A pump in the fourth compartment returns the water to the fish tank under the control of a float-actuated switch located in the fish tank.

BRIEF DESCRIPTION OF THE DRAWINGS

A preferred embodiment of the present invention is illustrated in the accompanying drawings in which;

FIG. 1 is an exploded and cut-away plan view in perspective of the filter of the present invention; and FIG. 2 shows an alternate arrangement for removing surface water from an overflow tank to a drain pipe.

DESCRIPTION OF THE PREFERRED EMBODIMENT

Referring now to the drawings in greater detail, the FIG. 1 illustrates the the fish tank filter of the present invention, shown generally at 1. The filter 1 comprises a overflow tank 3 that is located within a fish tank 2 and is adapted to receive an overflow of surface waters from the fish tank. A gravity drain 15 is provided in the bottom 14 of the overflow tank 3, which drain 15 opens into a drain pipe 16 having a perforated distal end 17 that is mounted above a dry filter 20. Surface waters overflowing into the overflow tank 3 exit the overflow tank 3 by means of the drain 15 and pass through the drain pipe 16 and out of the perforations 18 at the distal end 17 of the drain pipe 16 to and through a dry filter 20. The effluent from the dry filter 20 flows to an through a wet filter 70, after which it is returned by means of a pump 96 through a return pipe 98 to the fish tank 2.

In the illustrated embodiment the fish tank 2 is shown as rectangular in shape, which is common. However, the filter of the present invention will function equally well with fish tanks of different configurations. The fish tank 2, as illustrated, comprises four walls 4, 5, 6, 7 of substantially equal height and a bottom 8. The overflow tank 3 is formed by providing a fifth and somewhat shorter wall 12 disposed diagonally within a corner 9 of the fish tank 2 formed by two walls 4, 5 of the fish tank 2. As water in the fish tank 2 rises to the top 13 of the shorter wall 12 it will flow over the top 13 of the wall 12 and into the overflow tank 3. Extending upward from the shorter wall 12 is a non-metallic screen 11 that serves as a trap or filter to prevent dead fish and other large debris from floating over the shorter wall 12 and entering the overflow tank 3 and clogging the drain 15. It will be readily seen that the location and configuration of the overflow tank 3 are not limited to those shown in the drawing. The overflow tank 3 might be located in any corner of the fish tank 2 or along any side of the fish tank 2 or it might be altogether removed from the walls 4, 5, 6, 7 of the fish tank 2. In addition, the overflow tank 3 might be square or circular or some other shape, the primary consideration being that the overflow tank 3 be adapted to receive an overflow of surface waters from the fish tank 2, and that the overflow tank 3 be adapted to convey the overflowed waters out of the overflow tank 3 and into the first filter 20.

The distal end 17 of the drain pipe 16 is adapted to disperse water from the overflow tank 3 over the dry filter 20 through perforations 18 in the distal end 17 of the drain pipe 16.

The dry filter 20 comprises a first filter pan 21 having four walls 22, 23, 24, 25 and a bottom 26; a second filter pan 31 having four walls 32, 33, 34, 35, and a bottom 36; a third filter pan 41 having four walls 42, 43, 44, 45 and a bottom 46; a fourth filter pan 51 having four walls 52, 53, 54, 55 and a bottom 56; and a collector pan 61 having four walls 62, 63, 64, 65, and a bottom 66. The filter pans 21, 31, 41, 51 are stacked vertically and are set in the collector pan 61. The second, third and fourth filter pans 31, 41, 51 in the stack and the collector pan 61 are each provided with a plurality of spacers 69 adapted to sit on the bottoms 36, 46, 56, 66 of the said pans 31, 41, 51, 61 and to support above the bottoms 36, 46, 56, 66 of the said pains 31, 41, 51, 61 the pan or pans above in the stack. Each filter pan 21, 31, 41, 51 is provided with a plurality of perforations 29 in the bottoms 26, 36, 46, 56 of the pan 21, 31, 41, 51 adapted to allow the flow of effluent from the top-most filter pan 21 in the stack to the next lower pan 31, to the next lower pan 41, to the lowest filter pan 51 and finally into the collector pan 61. Perforations 29 in the bottoms 26, 36, 46, 56 of the filter pans 21, 31, 41, 51 are distributed generally over the entire bottoms 26, 36, 46, 56 of the pans 21, 31, 41, 51. The collector pan 61 is provided with a plurality of perforations 68 distributed over a portion 67 of the bottom 66 of the said pan 61.

A layer of crushed coral gravel 28 or other suitable filter material is provided over the bottom 26, 36, 46, 56 of each filter pan 21, 31, 41, 51, and the five pans 21, 31, 41, 51, 61 are stacked in a vertical spaced apart relationship as shown, with each filter pan 21, 31, 41, 51 sitting on the spacers 69 in the pans 31, 41, 51, 61 below.

Water from the drain pipe 16 is diffused over the filter material 28 in the first filter pan 21 and filters through the filter material 28 passing out of the first drain pan 21 through the perforations 29 in the bottom 26 of the pan 21 and over the filter material 28 in the second filter pan 31. The process is repeated in the second, third and fourth filter pans 31, 41, 51 after which the effluent drains into the collector pan 61. As the water passes through the filter material 28 in each filter pan 21, 31, 41, 51 the water is aerated due to a substantial increase in the surface area of the water. Floating waste and scum from the top of the fish tank water are trapped and rendered biologically harmless in the filter material 28, thus cleansing the water. As can be seen, the dry filter serves to clean and aerate the water so that when a properly sized filter is employed it is not necessary to ever replace water in the fish water 2.

The wet filter 70 comprises a tank 71 that, in the illustrated embodiment, has four vertical walls 72, 73, 74, 75 and a bottom 76 and is divided into four compartments 90, 91, 92, 93 by means of three vertical partitions 77, 78, 79 that extend across the full width of the tank 71 parallel with the ends 72, 74 of the tank 71. The first partition 77 extends from near the top 80 of the tank 71 to a line 81 above the bottom 76 of the tank 71 so that the first compartment 90 communicates with the second compartment 91 by means of a space 83 between the bottom 82 of the first partition 77 and the bottom 76 of the tank 71. The third partition 79 extends from near the top 80 of the tank 71 to a line 86 above the bottom 76 of the tank 71. A space 88 between the bottom 87 of the third partition 79 and the bottom 76 of the tank 71 is filled with a non-metallic mesh 89, so that the third compartment 92 communicates with the fourth compartment 93 by means of the non-metallic mesh 89 in the space 88 between the bottom 86 of the third partition 79 and the bottom 76 of the tank 71. The second partition 78 extends from the bottom 76 of the tank 71 to a line 84 below the tops 80, 80a, 80b of the tank 71 and the first partition 77 and the third partition 79 respectively.

A quantity of crushed coral gravel or other suitable filter material 95 is provided in the bottom of the first, second and third compartments 90, 91, 92 to a level above the levels of the bottoms 82, 87 of the first and third partitions 77, 79 and below the top 85 of the second partition 78.

The wet filter 70 is placed below the collector pan 61 of the dry filter 20 so that water dripping out of the perforations 68 in the bottom 66 of the collector pan 61 will drip into the first compartment 77 of the wet filter 70. The tank 71 is filled with water 100 to the level of the top 85 of the second partition 78. A submersible pump 96 having a return pipe 98 attached thereto is submerged in the water in the fourth compartment 93. Operation of the pump 96 is controlled by a float actuated switch 97 located in the fish tank 2. The height of the float actuated switch 97 is adjusted within the fish tank 2 so that the switch 97 will turn the pump 96 off when the water level in the fish tank 2 rises to a predetermined level, thus preventing the fish tank 2 from overflowing if the drain 15 should become clogged.

As water drips from the dry filter 20 into the first compartment 77 of the wet filter 70 the water level rises in the four compartments 90, 91, 92, 93 of the wet filter 70. Water in the fourth compartment 93 is returned to the fish tank 2 by means of the pump 96 and return pipe 98. When the water level rises in the fish tank 2 above a predetermined level the switch 97 in the fish tank 2 turns the pump 96 off. As water is drawn out of the fourth compartment 93 water in the bottom of the third compartment 92 flows into the fourth compartment 93, through the non-metallic mesh 89 in the opening 88 between the bottom 87 of the third partition 79 and the bottom 76 of the tank 71 as the water levels in the two compartments 92, 93 tend to equalize. The water level in the first compartment 90 rises as water drips into the compartment 90 from the dry filter 20 above the compartment 90, and the water level in the second compartment 91 will respond by rising to match the level in the first compartment 90. When the water level in the second compartment 90 rises to the top 85 of the second partition 78 further dripping of water from the dry filter 20 into the first compartment 90 of the water filter 70 will result in water overflowing the top 85 of the second partition 78 and spilling into the third compartment 92.

Thus it can be seen that water dripping from the dry filter 20 into the first compartment 90 of the wet filter 70 and the pumping of water out of the fourth compartment 93 and into the fish tank 2 produces a flow of water through the filter material 95 in the bottom of the first compartment 90; through the opening 83 between the bottom 82 of the first partition 77 and the bottom 76 of the tank 71 into the second compartment 91; through the filter material 95 in the second compartment 91 and over the top 85 of the second partition 78 into the third compartment 92; through the filter material 95 in the third compartment 92; through the mesh 89 in the opening 88 between the bottom 87 of the third partition 79 and the bottom 76 of the tank 71 and into the fourth compartment 93 where it is pumped by the pump 96 through the return pipe 98 back into the fish tank 2.

Water dripping from the dry filter 20 into the wet filter 70 is relatively clean and oxygen rich due to the action of the dry filter in cleaning and aerating the water. However water entering into the wet filter 70 is laden with ammonia which survives the action of the dry filter 20. The constant presence of water in the wet filter 70 allows for the development of bacteria in the wet filter 70 which bacteria convert the ammonia in the effluent from the dry filter 20 to nitrites and then to nitrates, thus further purifying the water, which is then returned to the fish tank.

FIG. 2 illustrates an alternate embodiment of my invention in which a pump 99 replaces the gravity drain 15 in the bottom 14 of the overflow tank 3 as a means for carrying overflow waters from the overflow tank 3 to the drain pipe 16.

Having thus described my invention, what I now claim is:

1. A fish tank filter comprising a means for collecting surfaces waters from a fish tank; means for conveying the said surface waters to a dry filter; a dry filter adapted to receive the said surface waters and comprising a plurality of containers each having provided therein a filter material, each of the said containers being adapted to receive effluent from a fish tank or from another of the plurality of containers and adapted to allow the said effluent to flow through the said filter material therein and out of the said container; means for conveying the effluent from the plurality of filter containers to a wet filter; a wet filter adapted to receive effluent from the said dry filter and adapted to filter the said effluent comprising a plurality of compartments, a plurality of the said compartments being provided therein with a filter material, the said wet filter being adapted to allow effluent to flow into each compartment and through any filter material in each of the said compartments and out of each of th compartments in turn from the first compartment to the last compartment, the said wet filter tank having provided therein a quantity of water to a level adapted to facilitate the flow of water from compartment to compartment; and means for conveying the effluent from the wet filter into a fish tank.

2. A fish tank filter comprising a means for collecting surface waters from a fish tank; means for conveying the said surface waters to a dry filter; a dry filter adapted to receive the said surface waters and comprising a plurality of filter pans arranged in a vertical stack and supported in spaced apart relationships relative to one another wherein each of the said filter pans is provided in the bottom thereof with a layer of filter material and wherein each of the said filter pans is adapted to allow the said surface waters to pass through the bottom thereof, a collector pan adapted to receive the effluent from the said plurality of filter pans and having a bottom that adapted to convey the said effluent therethrough and into a wet filter, and wherein the said plurality of filter pans is stacked in a spaced apart relationship above the said collector pan; a wet filter adapted to receive effluent from the said dry filter and adapted to filter the said effluent comprising a tank that is divided into a plurality of compartments, a plurality of the said compartments being provided with filter material in the bottom thereof, and wherein the said tank is adapted to allow effluent from the dry filter to flow into each compartment and through any said filter material therein and out of each compartment in turn from the first compartment to the last compartment, the said wet filter tank having provided therein a quantity of water to a level adapted to facilitate the flow of water from compartment to compartment, a submersible pump provided in the last compartment of the said wet filter, a float-actuated switch adapted to control the operation of the submersible pump, and a return pipe adapted to carry effluent from the last compartment into the top of a fish tank.

3. A fish tank filter comprising an overflow tank adapted to receive an overflow of surface waters from a fish tank; trap means adapted to prevent large debris from entering into the overflow tank; a gravity drain in the bottom of the overflow tank adapted to convey water into a drain pipe; a drain pipe having a proximal end that is adapted to receive water from the drain in the bottom of the overflow tank and a distal end located over a dry filter and having perforations adapted to release the water over a dry filter; a dry filter adapted to receive overflow waters from the said drain pipe and comprising a first filter pan, a second filter pan, a third filter pan and a fourth filter pan, each of the said filter pans having a bottom that is provided with a plurality of perforations therethrough adapted to allow overflow waters to pass therethrough and adapted to support a layer of filter material distributed thereover, wherein the said filter pans are stacked vertically in spaced apart relationships relative to each other maintained by a plurality of spacers that are adapted to separate the bottoms of the first, second and third filter pans from the bottoms of the second, third or fourth filter pans, a layer of filter material distributed over the bottom of each of the said filter pans, a collector pan adapted to receive the effluent from the said fourth filter pan and having a bottom that is provided with a plurality of perforations therethrough adapted to allow effluent from the plurality of filter pans to pass therethrough and adapted to deliver the said effluent to a wet filter, wherein the said collector pan is adapted to support a stack of filter pans seated thereon in a spaced apart relationship therefrom maintained by a plurality of spacers adapted to separate the bottom of the fourth filter pan from the bottom of the collector pan, a plurality of spacers adapted to separate the bottom of the fourth filter pan from the bottom of the collector pan, wherein the spacers of the said plurality of spacers are placed in spaced apart relationships in the bottom of the said collector pan and wherein the said stack of filter pans is set onto the said collector pan and onto the said plurality of spaced apart spacers; a wet filter adapted to receive effluent from the said dry filter and adapted to filter the said effluent comprising a compartmented tank having a plurality of vertical walls and a bottom and a first vertical partition, a second vertical partition and a third vertical partition adapted to divide the said tank into a first compartment, a second compartment, a third compartment, and a fourth compartment, wherein the said first compartment communicates with the said second compartment and the said second compartment communicates with the said third compartment and the said third compartment communicates with the said fourth compartment, and wherein the said first vertical partition extends laterally across the width of the tank and extends vertically from near the top of the said tank to a line above the bottom of the tank creating an opening between the bottom of the said partition and the bottom of the said tank, and wherein the said second vertical partition extends laterally across the width of the tank and extends vertically from the bottom of the said tank to a line below the top of the tank and below the top of the said first vertical partition, and wherein the said third vertical partition extends laterally across the width of the tank and extends vertically from near the top of the said tank and above the top of the second vertical partition to a line above the bottom of the tank creating an opening between the bottom of the said third partition and the bottom of the said tank, and a filter means comprising a non-metallic mesh screen extending across the said opening between the said bottom of the said third partition and the bottom of the said tank, said filter material being adapted to allow the flow of effluent from the third compartment into the fourth compartment and adapted to inhibit the movement of filter material from the said third compartment into the said fourth compartment, a quantity of filter material provided in the bottom of the first, second and third compartments to a level above the levels of the bottoms of the first and third partitions and below the top of the second partition, the said wet filter tank being filled with water to the level of the top of the second partition; a submerisble pump provided in the fourth compartment; a float-actuated switch adapted to control the operation of the submersible pump; and a return pipe adapted to carry effluent from the fourth compartment into the top of a fish tank, wherein the height of the float actuated switch is adjusted within the fish tank so that the switch will turn the pump off when the water level in the fish tank rises to a predetermined level.

4. A fish tank filter comprising an overflow tank adapted to receive an overflow of surface waters from a fish tank; trap means adapted to prevent large debris from entering into the overflow tank; a gravity drain in the bottom of the overflow tank adapted to convey water into a drain pipe; a drain pipe having a proximal end that is adapted to receive water from the drain in the bottom of the overflow tank and a distal end located over a dry filter and having perforations adapted to release the water over a dry filter; a dry filter adapted to receive overflow waters from the said drain pipe and comprising a first filter pan, a second filter pan, a third filter pan and a fourth filter pan, each of the said filter pans having a bottom that is provided with a plurality of perforations therethrough adapted to allow overflow waters to pass therethough and adapted to support a layer of crushed coral gravel distributed thereover, wherein the said filter pans are stacked vertically in spaced apart relationships relative to each other maintained by a plurality of spacers that are adapted to separate the bottoms of the first, second and third filter pans from the bottoms of the second, third or fourth filter pans, a layer of crushed coral gravel distributed over the bottom of each of the said filter pans, a collector pan adapted to receive the effluent from the said fourth filter pan and having a bottom that is provided with a plurality of perforations therethrough adapted to allow effluent from the plurality of filter pans to pass therethrough and adapted to deliver the said effluent to a wet filter, wherein the said collector pan is adapted to support a stack of filter pans seated thereon in a spaced apart relationship therefrom maintained by a plurality of spacers adapted to separate the bottom of the fourth filter pan from the bottom of the collector pan, a plurality of spacers adapted to separate the bottom of the fourth filter pan from the bottom of the collector pan, wherein the spacers of the said plurality of spacers are placed in spaced apart relationships in the bottom of the said collector pan and wherein the said stack of filter pans is set onto the said collector pan and onto the said plurality of spaced apart spacers; a wet filter adapted to receive effluent from the said dry filter and adapted to filter the said effluent comprising a compartmented tank having a plurality of vertical walls and a bottom and a first vertical partition, a second vertical partition and a third vertical partition adapted to divide the said tank into a first compartment, a second compartment, a third compartment, and a fourth compartment, wherein the said first compartment communicates with the said second compartment and the said second compartment communicates with the said third compartment and the said third compartment communicates with the said fourth compartment, and wherein the said first vertical partition extends laterally across the width of the tank and extends vertically from near the top of the said tank to a line above the bottom of the tank creating an opening between the bottom of the said partition and the bottom of the said tank, and wherein the said second vertical partition extends laterally across the width of the tank and extends vertically from the bottom of the said tank to a line below the top of the tank and below the top of the said first vertical partition, and wherein the said third vertical partition extends laterally across the width of the tank and extends vertically from near the top of the said tank and above the top of the second vertical partition to a line above the bottom of the tank creating an opening between the bottom of the said third partition and the bottom of the said tank, and a filter means comprising a non-metallic mesh screen extending across the said opening between the said bottom of the said third partition and the bottom of the said tank, said filter material being adapted to allow the flow of effluent from the third compartment into the fourth compartment and adapted to inhibit the movement of filter material from the said third compartment into the said fourth compartment, a quantity of crushed coral gravel provided in the bottom of the first, second and third compartments to a level above the levels of the bottoms of the first and third partitions and below the top of the second partition, the said wet filter tank being filled with water to the level of the top of the second partition; a submersible pump provided in the fourth compartment; a float-actuated switch adapted to control the operation of the submersible pump; and a return pipe adapted to carry effluent from the fourth compartment into the top of a fish tank, wherein the height of the float actuated switch is adjusted within the fish tank so that the switch will turn the pump off when the water level in the fish tank rises to a predetermined level.

* * * * *